United States Patent
Tsang et al.

(10) Patent No.: US 12,008,352 B2
(45) Date of Patent: Jun. 11, 2024

(54) TRANSFORMATION OF A LOOP WITHIN COMPUTER CODE TO MINIMIZE ITERATIONS

(71) Applicant: INTERNATIONAL BUSINESS MACHINES CORPORATION, Armonk, NY (US)

(72) Inventors: Wai Hung Tsang, Markham (CA); Ettore Tiotto, Whitby (CA); Bardia Mahjour, Newmarket (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 17/456,433

(22) Filed: Nov. 24, 2021

(65) Prior Publication Data

US 2023/0161575 A1  May 25, 2023

(51) Int. Cl.
  *G06F 8/41* (2018.01)
(52) U.S. Cl.
  CPC .................... *G06F 8/4441* (2013.01)
(58) Field of Classification Search
  CPC ...... G06F 8/443; G06F 8/4443; G06F 8/4442; G06F 8/4441
  See application file for complete search history.

(56) References Cited

U.S. PATENT DOCUMENTS

| | | | |
|---|---|---|---|
| 6,571,385 B1* | 5/2003 | Muthukumar | G06F 9/30072 712/E9.05 |
| 8,793,675 B2 | 7/2014 | Lin et al. | |
| 9,170,812 B2 | 10/2015 | Vorbach et al. | |
| 2003/0233643 A1* | 12/2003 | Thompson | G06F 9/3842 712/E9.05 |
| 2009/0064119 A1* | 3/2009 | Archambault | G06F 8/4441 717/160 |
| 2009/0083724 A1 | 3/2009 | Eichenberger et al. | |
| 2010/0199354 A1* | 8/2010 | Eker | G06F 21/14 726/26 |
| 2010/0235819 A1* | 9/2010 | Rose | G06F 9/45516 717/160 |
| 2012/0167069 A1* | 6/2012 | Lin | G06F 8/456 717/160 |
| 2012/0185673 A1* | 7/2012 | Yoo | G06F 9/3889 712/30 |
| 2012/0210099 A1* | 8/2012 | Gonion | G06F 9/30036 712/E9.038 |
| 2019/0004798 A1* | 1/2019 | Zbiciak | G06F 9/30065 |

(Continued)

OTHER PUBLICATIONS

IBM, "z/Architecture—Principles of Operation," IBM Publication No. SA22-7832-12, Thirteenth Edition, Sep. 2019, pp. 1-2000.

(Continued)

*Primary Examiner* — Wei Y Zhen
*Assistant Examiner* — Amir Soltanzadeh
(74) *Attorney, Agent, or Firm* — Eric Chesley, Esq.; Blanche E. Schiller, Esq.; Heslin Rothenberg Farley & Mesiti P.C.

(57) ABSTRACT

A loop within computer code is transformed to minimize loop iterations. A determination is made using statistical information relating to the loop whether the loop that has an early exit indication is to be transformed to minimize iterations of the loop. Based on determining that the loop is to be transformed, the loop is transformed.

20 Claims, 6 Drawing Sheets

(56) References Cited

U.S. PATENT DOCUMENTS

| | | | | |
|---|---|---|---|---|
| 2020/0249923 | A1* | 8/2020 | Tsugane | G06F 8/4441 |
| 2020/0371763 | A1* | 11/2020 | Doshi | G06F 8/452 |
| 2020/0387799 | A1* | 12/2020 | Vivekraja | G06N 3/105 |
| 2021/0157591 | A1* | 5/2021 | Zbiciak | G06F 9/383 |
| 2022/0060431 | A1* | 2/2022 | Vadayadiyil Raveendran | H04L 41/12 |
| 2023/0003614 | A1* | 1/2023 | Simard | G02B 6/122 |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

Anonymous, "Method and System of Restructuring Imperfect Loop Nest with Early Exits to Facilitate Locality Transformations," IPCOM000232309D, Oct. 31, 2013, pp. 1-6 (+ cover).

Vasilache, Nicholas et al., "Automatic Correction of Loop Transformations," $16^{th}$ International Conference on Parallel Architecture and Compilation Techniques, Sep. 15, 2017, pp. 1-11.

Wikipedia, "DBSCAN", https://en.wikipedia.org/wiki/DBSCAN, downloaded from internet Nov. 5, 2021, pp. 1-8.

Barton, Christopher et al., "Generalized Index-Set Splitting," Apr. 2015, pp. 102-115.

LLVM Compiler Infrastructure, "Dependence Graphs in LLVM," https://llvm.org/docs/DependenceGraphs/index.html#id6, downloaded from internet Apr. 6, 2021, pp. 1-5.

* cited by examiner

TRANSFORMATION OF A LOOP WITHIN COMPUTER CODE TO MINIMIZE ITERATIONS

BACKGROUND

One or more aspects relate, in general, to processing within a computing environment, and in particular, to facilitating such processing.

Processing within a computing environment includes executing computer programs that perform various tasks. Programs are typically written in a program code, referred to as source code, which is not understood by a machine, such as a computer. However, the source code is translated to machine code, referred to as machine language, which is understandable by a computer. This translation may be performed using a compiler. There are many available compilers, and different compilers offer different features. One feature that is offered is an optimization feature in which one or more optimizations are applied to the program to enhance program performance.

For example, compiler optimization techniques have been developed to enable loops within a program to execute faster. This is beneficial since most execution time of certain programs, such as scientific programs, is spent on loops within the programs.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes determining using statistical information relating to a loop within computer code whether the loop that has an early exit indication is to be transformed to minimize iterations of the loop. Based on determining that the loop is to be transformed, the loop is transformed.

Computer-implemented methods and computer systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In one or more aspects, a capability is provided to facilitate processing within a computing environment. For instance, processing associated with computer code that includes loops is facilitated by transforming one or more of the loops that include at least one early exit to minimize loop iterations, which increases execution speed of the loops and improves performance.

Figure 1:
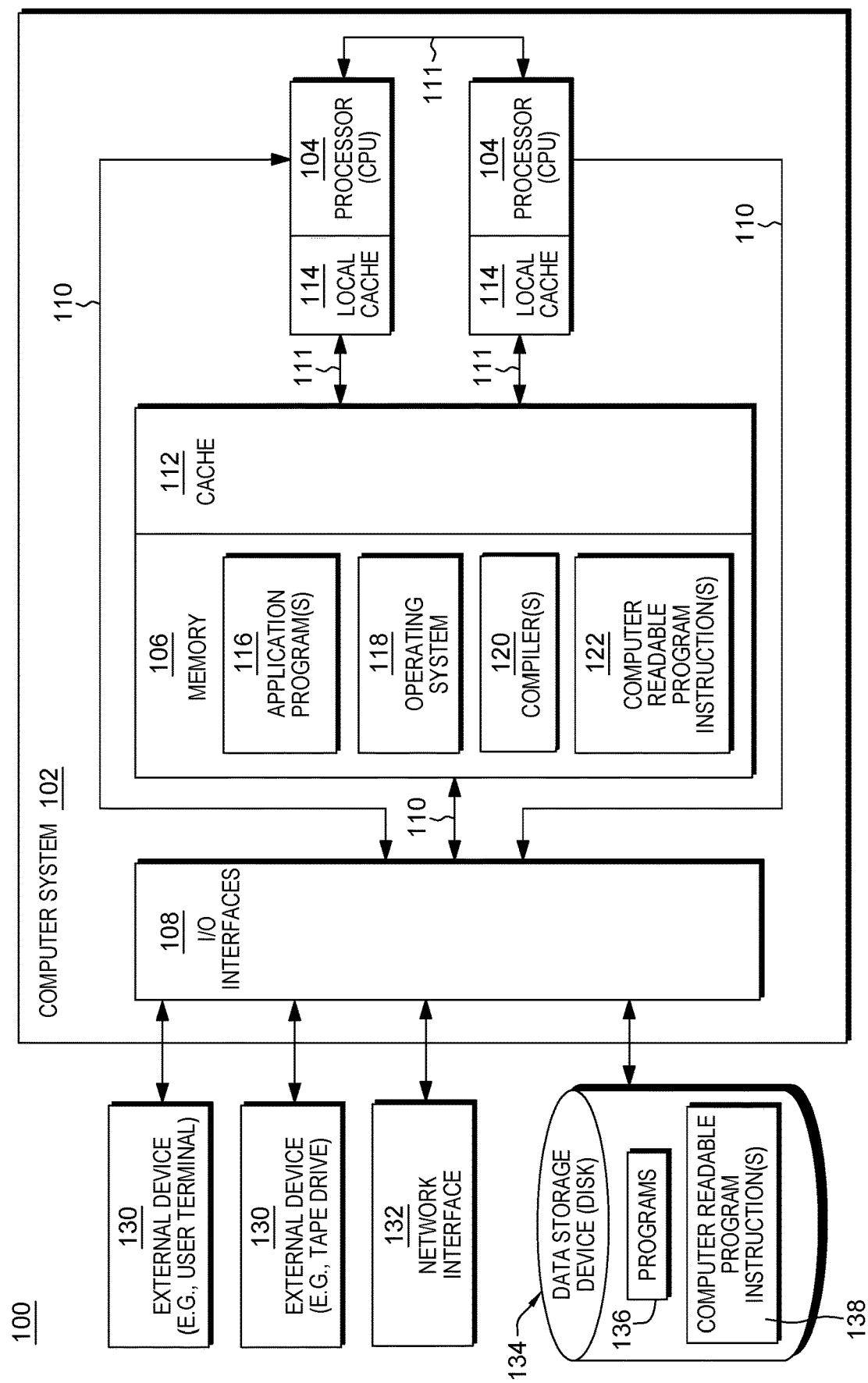
FIG. 1 depicts one example of a computing environment to include and/or use one or more aspects of the present invention.

In one aspect, the transformation is performed by e.g., a processor, and in one example, by a compiler executing on a processor. One example of a computing environment executing such a processor is described with reference to FIG. 1. As an example, the computing environment of FIG. 1 is based on the IBM® Power® instruction set architecture offered by International Business Machines Corporation, Armonk, New York. However, the Power instruction set architecture is only one instruction set architecture to be used; other instruction set architectures offered by International Business Machines Corporation and/or other corporations, entities, etc. may be used. IBM and Power are registered trademarks or trademarks of International Business Machines Corporation in at least one jurisdiction.

Referring to FIG. 1, in one example, a computing environment 100 includes, for instance, a computer system 102 shown, e.g., in the form of a general-purpose computing device. Computer system 102 may include, but is not limited to, one or more processors or processing units 104 (e.g., central processing units (CPUs) and/or special-purpose processors, etc.), a memory 106 (a.k.a., system memory, main memory, main storage, central storage or storage, as examples), and one or more input/output (I/O) interfaces 108, coupled to one another via one or more buses and/or other connections. For instance, processors 104 and memory 106 are coupled to I/O interfaces 108 via one or more buses 110, and processors 104 are coupled to one another via one or more buses 111.

Bus 111 is, for instance, a memory or cache coherence bus, and bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 112, such as a shared cache, which may be coupled to local caches 114 of one or more processors 104 via, e.g., one or more buses 111. Further, memory 106 may include one or more programs or applications 116, at least one operating system 118, one or more compilers 120 and one or more computer readable program instructions 122. Computer readable program instructions 122 may be configured to carry out functions of embodiments of aspects of the invention.

Computer system 102 may communicate via, e.g., I/O interfaces 108 with one or more external devices 130, such as a user terminal, a tape drive, a pointing device, a display, and one or more data storage devices 134, etc. A data storage device 134 may store one or more programs 136, one or more computer readable program instructions 138, and/or data, etc. The computer readable program instructions may be configured to carry out functions of embodiments of aspects of the invention.

Computer system 102 may also communicate via, e.g., I/O interfaces 108 with network interface 132, which enables computer system 102 to communicate with one or more networks, such as a local area network (LAN), a general wide area network (WAN), and/or a public network (e.g., the Internet), providing communication with other computing devices or systems.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general-purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As described herein, in one aspect, a compiler (e.g., compiler 120) of a processor (e.g., processor 104) transforms a loop within computer code (e.g., computer program, application, module, etc.) to minimize loop iterations. The loop to be transformed includes, for instance, an early exit in which the loop may exit prior to a last iteration of the loop. For instance, a loop can be terminated before the last iteration 'Li' if there exists an iteration I (where I<Li) after which no further side effects (e.g., modifications of global variables outside their local environment) are observable and live-out variables are not overwritten with different values, for instance, as variables that hold a value that may be used in future processing. That is, such a loop reaches a fixed point of processing, in which after iteration 'I': there are no instructions in the loop that potentially have a side effect (e.g., calls to functions that might create a side effect (e.g., printf)), and live-out variables are not overwritten with a different value.

As an example, consider the following loop (referred to herein as Example Loop):

```
unsigned x=0;
for (int i=0; i<N; ++i)
    if (A[i])
        x=1; // used after the loop (i.e., live-out)
```

If A[i] is true, the loop reaches a fixed point of processing, because the value assigned to variable x can no longer be changed in subsequent loop iterations. In one example, this type of loop can be exited, for instance, immediately after variable x is updated, as shown below:

```
unsigned x=0;
for (int i=0; i<N; ++i)
    if (A[i]) {
        x=1;
        break; // early exit
    }
```

For the above Example Loop with early exit, certain optimizations may be performed, in accordance with one or more aspects of the present invention. As an example, when A[i] evaluates to true for a particular value of 'I' that is closer to the end of the loop iteration space, loop reversal may be performed providing a transformed loop, an example of which is depicted below. The transformed Example Loop has better performance than the Example Loop with early exit described above. One example of the transformed Example Loop with loop reversal is provided below:

```
unsigned x=0;
for (int i=N-1; i>=0; --i) //loop reversal
    if (A[i]) {
        x=1;
        break; // early exit
    }
```

Further, in one aspect, if statistical information indicates, for instance, that A[M] is likely to be true (and A[i] is likely to evaluate to false for each i<M), the transformed code depicted below, as one example, is likely to have improved performance:

```
unsigned x=0;
for (int i=M; i<N; ++i)
    if (A[i]) { // high probability of evaluating to true for i=M
        x=1;
        goto loopend;
    }
for (int i=0; i<M; ++i) // low probability to be executed
    if (A[i]) {
        x=1
        break;
    }
loopend:
```

In one or more aspects, to increase execution speed of loops, such as loops that have early exits, loop transformation is performed to optimize processing of the loops. As examples, transformation of a loop (with at least one early exit) to minimize loop iterations includes, for instance, index set splitting of loop iteration space and loop re-ordering, and/or loop reversal, as described herein.

One example of processing to perform early exit loop transformation is described with reference to FIG. 2. As an example, this processing is implemented in a compiler (e.g., compiler 120). One example compiler is the LLVM compiler, but one or more aspects of the present invention may be implemented and/or used by other compilers.

Figure 2:
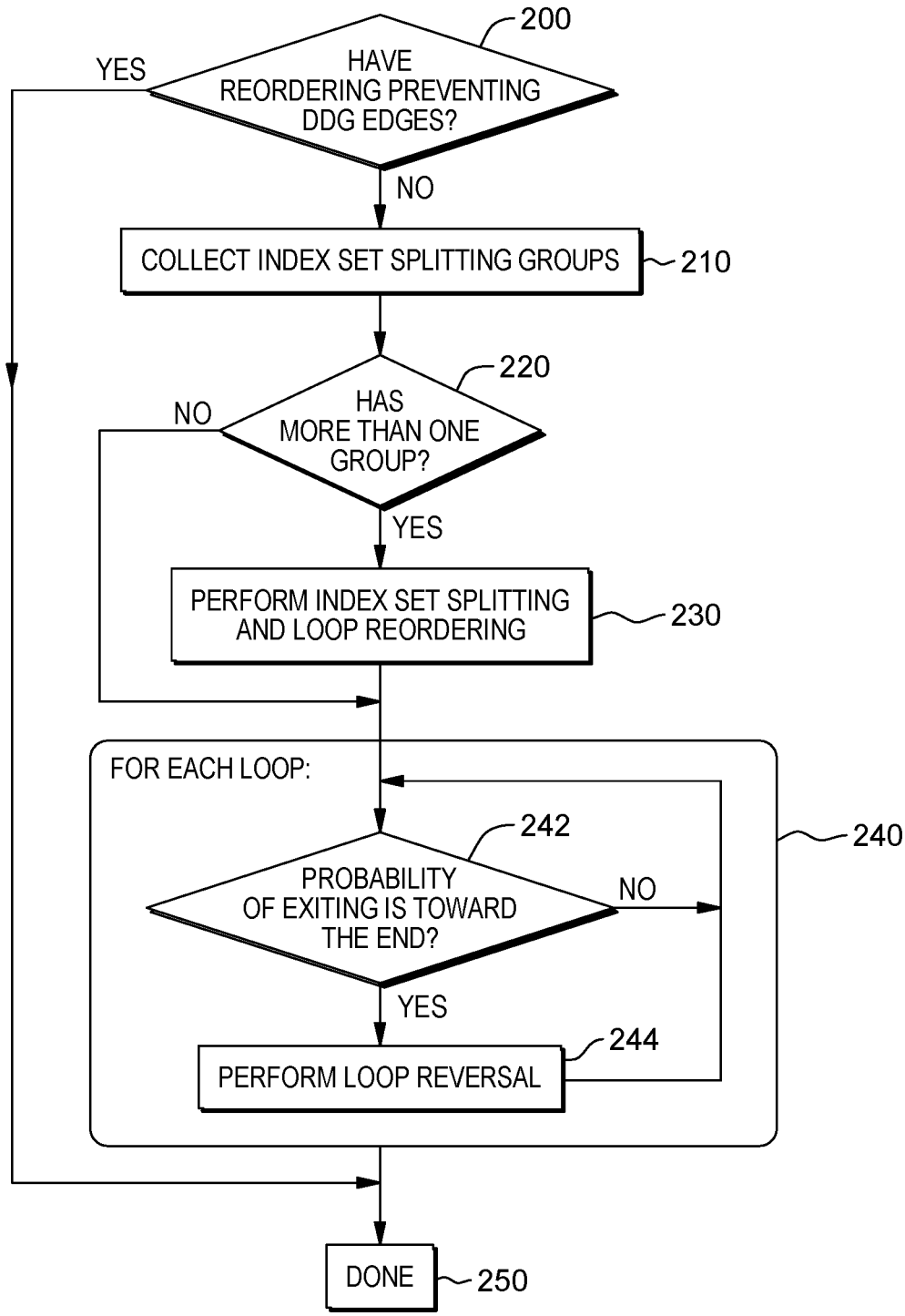
FIG. 2 depicts one example of processing to transform a loop within computer code based on statistical information, in accordance with one or more aspects of the present invention.

Referring to FIG. 2, in one embodiment, initially a check is made to determine whether it is safe to perform a transformation for a given loop 200; i.e., will data dependencies in the code prior to transformation be preserved after transformation is applied. For instance, this check is performed by constructing a data dependence graph (DDG) and then examining edges in the graph. If the analysis identifies an edge that prevents reordering for all or a part of the loop iteration space, then the transformation is deemed unsafe, and processing continues to done 250.

However, if it is safe to proceed with the transformation, index set splitting groups for the loop are collected in sorted order 210. This may be performed using one or more clustering techniques now known or later developed. As an example, a clustering technique partitions the iteration space of the loop into a plurality of groups based on, e.g., density (d) and probability distribution of the exit points.

One example clustering technique is shown below but other techniques may be used without departing from a spirit of aspects of the present invention.

Operations to determine or collect candidate exit points groups:
Group Exit Points:
　$\forall e_1 \exists e_2$ in the same group G, where $|e_1-e_2|<d$
　Sort groups by descending $\Sigma_{e \in G}$ Prob(e):
Filter Groups:
　Keep groups with $\Sigma_{e \in G}$ Prob(e)>P
　Keep the first N groups, where (N+1)*LoopSize≤Code Size Budget
Expand Groups:
　Include iteration points between the minimum and maximum points in G.
　Include iteration points larger than the maximum point in G, but smaller than the minimum points in next group.
　If the beginning of the iteration space is not already in a group, then form a group from the beginning of the iteration space up to (but not including) the smallest point in the existing groups.

There are, e.g., three heuristic factors in this processing, namely d, P, and Code Size Budget. d can be interpreted as the desired density of the iteration points. A smaller d means that the exit iteration points are to be closer to each other to be considered part of the same group. P is the minimum threshold that the sum of probability of exit points in a given group is to reach, before they can be considered as a distinct index set splitting range. A bigger P means that there will be less groups formed. Code Size Budget is used to control code growth. This is used since index set splitting creates multiple copies of the original loop.

After collecting the candidate exit points groups, a determination is made as to whether there is more than one group 220. Should there be only one group, processing continues to loop reversal consideration 240 described below; otherwise, index set splitting and loop re-ordering are performed 230. As an example, index set splitting is based on the range of indices in each of the computed groups. This will form N loops, where N is the number of groups created in the previous processing. Based on creating the distinct loops for each range of indices, these loops are re-ordered based on their sorted group order. This places the range of the iteration space with, e.g., the highest probability ahead of less probable ranges, resulting in reduced average arrival time at the exit point.

Further, in one example, for each of the generated loops, loop reversal is considered 240. For instance, a determination is made as to whether the probability of exiting the loop is higher at the end of the loop 242. If not, then processing continues to the next loop of the generated loops; however, if the probability of exiting the loop is higher at the end of the loop, then loop reversal is performed, as described above, 244.

One particular example of collecting candidate splitting groups is described with reference to FIGS. 3A-3E. Consider a loop that iterates from 0 to 99 with the exit points and their corresponding probabilities as outlined in FIG. 3A. Also note that in this example, d is heuristically set to 5 and P is heuristically set to 30%. Other values for d and P may be used. Also, a loop may have more or fewer iterations. Other examples are possible.

Figure 3A:
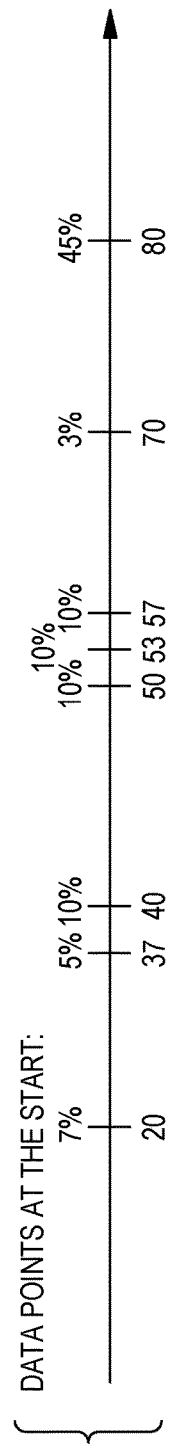
FIGS. 3A-3E depict one example of partitioning an iteration space of a loop to obtain exit point groups, in accordance with one or more aspects of the present invention.
Figure 3B:
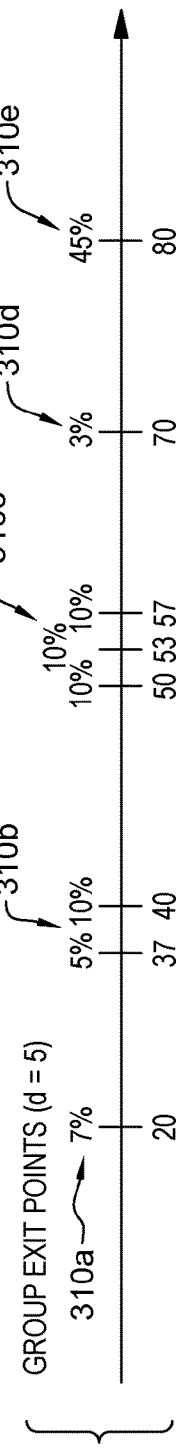
Figure 3C:
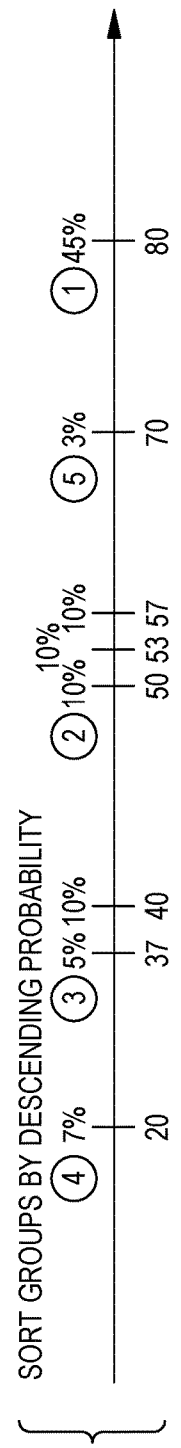
Figure 3D:
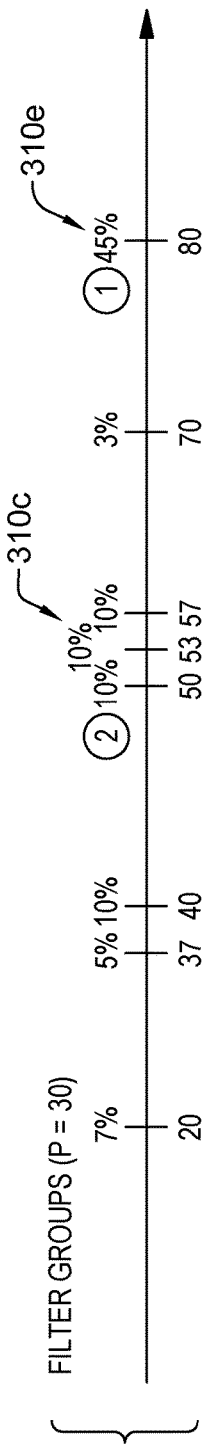
Figure 3E:
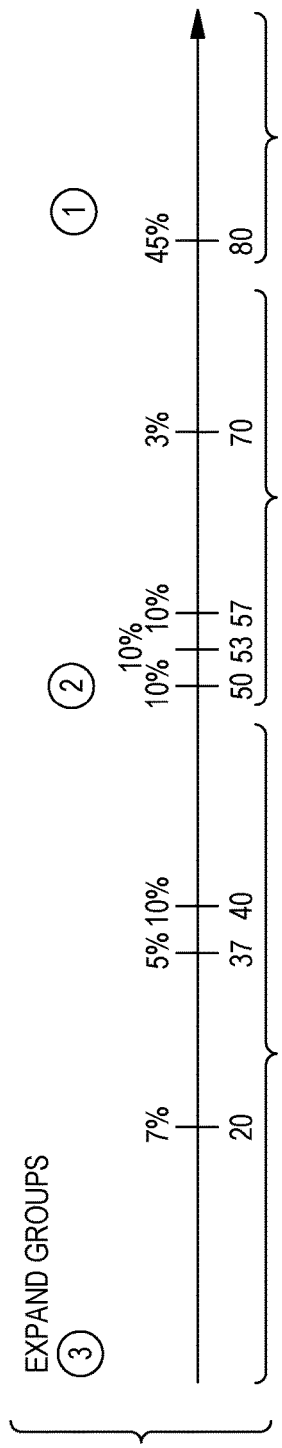

Referring to FIG. 3A, the data points at the start are shown. For instance, the probability of exiting when i is equal to 20 is 7%; i is equal to 37 is 5%; i is equal to 40 is 10%; i is equal to 50, 53 or 57 are each 10%; i is equal to 70 is 3%; and i is equal to 80 is 45%. The exit points are then grouped, as shown in FIG. 3B. In this example, a group is formed if the density is less than 5 (e.g., d=5). Therefore, in this example, there are five groups (310a-310e); five groups are coincidental to d=5. The groups are sorted, in one example, by descending probability, as depicted in FIG. 3C. Further, in one example, the groups are filtered by P (e.g., P=30%), as shown in FIG. 3D. After filtering, in this example, there are two groups (310c, 310e) remaining. Additionally, in one example, the groups are expanded, as described above (see Expand groups), an example of which is depicted in FIG. 3E. At a conclusion of the process, there are three groups, and therefore, three loops are created from the given loop.

In one example, the given loop is index set split into three loops, with iteration spaces 80-99, 50-79 and 49-0, respectively. The loops are ordered, in one example, by the probability of exiting from that loop, as shown in FIG. 3E. The last loop (e.g., loop 3), in one example, is reversed, since the probability of exiting toward the end is higher than the beginning.

Described herein is a capability for transforming a loop, such as an early exit loop, to minimize iterations. The transformation includes, for instance, index set splitting and re-ordering and/or loop reversal. Since performance improvement diminishes when the early exit iteration falls toward the end of the iteration space, in accordance with one or more aspects of the present invention, loop reversal is performed. Further, if there is an iteration where the conditional expression used in the branch inside the loop body is likely to be true, index set splitting improves performance. Other examples and/or variations are possible.

In one or more aspects, the number of iterations to be executed for a loop is minimized by leveraging statistical information (e.g., information learned via, e.g., Profile Guided Optimizations or other statistical techniques, about a loop, such as when a loop typically iterates, etc.) to perform one or more transformations (e.g., re-order iteration sequence of loops provided from a given loop; loop reversal; etc.). In one or more aspects, a loop iteration space is to be reversed when there are multiple exit iterations with similar probability, and they fall in, e.g., the second half of the iteration space. On the other hand, if there is an exit iteration that has a high probability, then index set splitting can improve performance. Other examples are possible.

In one or more aspects, a technique (e.g., a computer-implemented process) to optimize loops with at least one early exit using statistical information (e.g., Profile Guided Optimization and/or other statistical information) is provided. The technique includes, in one example, determining safety of performing a transformation of a loop using edges in a constructed data dependence graph in an analysis to identify whether an edge prevents reordering of a part of a loop iteration space; based on determining that the edge prevents reordering of a part of the loop iteration space, indicating the transformation is unsafe; based on determining that the transformation is safe, computing set candidate exit point groups in a sorted order (e.g., descending order) to partition the loop iteration space into groups using parameters of, e.g., a desired density of iteration points, a probability distribution of exit point and a code size budget; performing index set splitting using a range of indices in each of the candidate exit point groups computed to form N loops, where N is a number of groups created in the candidate exit points groups; reordering the N loops using a sorted group order to place a range of the iteration space with a highest probability ahead of less probable ranges, resulting in a reduced average arrival time at an exit point; and based on a determination, for each of the generated loops, if probability of exiting the loop is higher toward an end, performing a loop reversal.

One or more aspects of the present invention are inextricably tied to computer technology and facilitate processing within a computer, improving performance thereof. The use of a process to transform a loop to minimize the number of loop iterations to be executed by the loop, allows the loop to execute faster and improves performance.

Although embodiments are described herein, other variations and/or embodiments are possible.

Figure 4A:
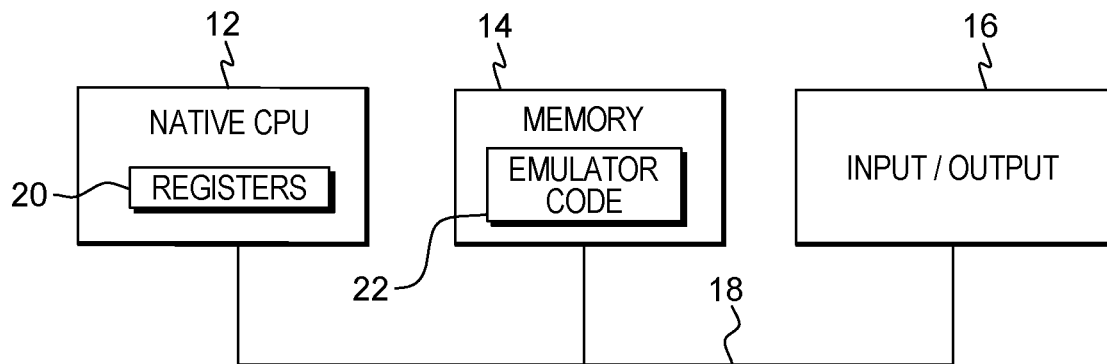
FIG. 4A depicts another example of a computing environment to incorporate and/or use one or more aspects of the present invention.

Another example of a computing environment to incorporate and use one or more aspects of the present invention is described with reference to FIG. 4A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include an IBM® Power® processor offered by International Business Machines Corporation, Armonk, New York; an HP Superdome with Intel® processors offered by Hewlett Packard Co., Palo Alto, California; and/or other machines based on architectures offered by International Business Machines Corporation, Hewlett Packard, Intel Corporation, Oracle, or others. Intel is a trademark or registered trademark of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than, e.g., the IBM® z/Architecture® instruction set architecture, such as Power processors, HP Superdome servers or others, to emulate the z/Architecture instruction set architecture and to execute software and instructions developed based on the z/Architecture instruction set architecture. z/Architecture is a trademark or registered trademark of International Business Machines Corporation in at least one jurisdiction.

Figure 4B:
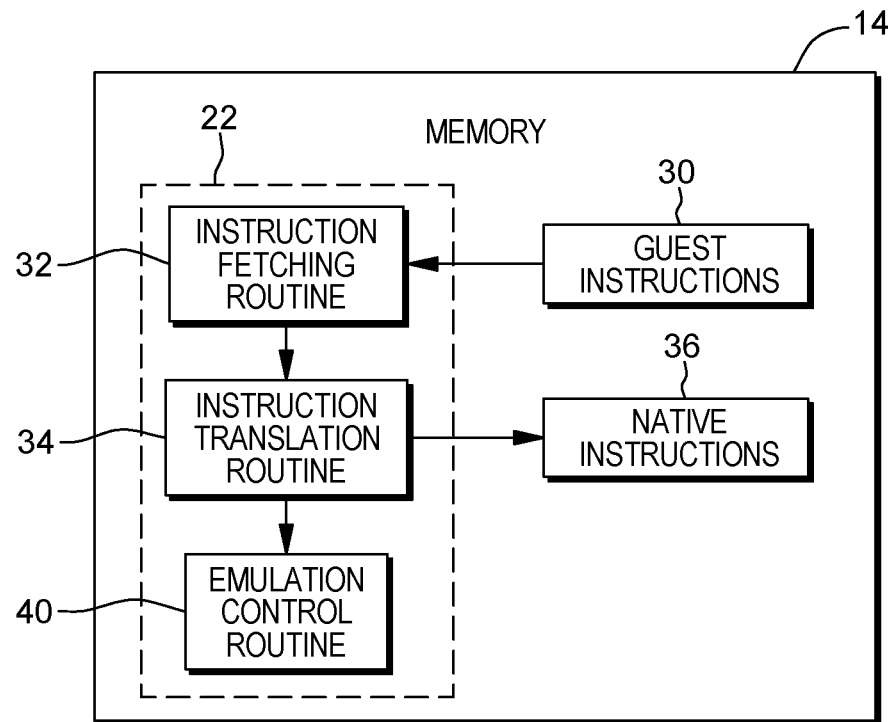
FIG. 4B depicts further details of the memory of FIG. 4A, in accordance with one or more aspects of the present invention.

Further details relating to emulator code 22 are described with reference to FIG. 4B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture instruction set architecture, but instead, are being emulated on native CPU 12, which may be, for example, an Intel processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured to transform a loop having an early exit, and/or to perform one or more other aspects of the present invention.

Although various embodiments are described herein, many variations and other embodiments are possible without departing from a spirit of aspects of the present invention. It should be noted that, unless otherwise inconsistent, each aspect or feature described herein, and variants thereof, may be combinable with any other aspect or feature.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
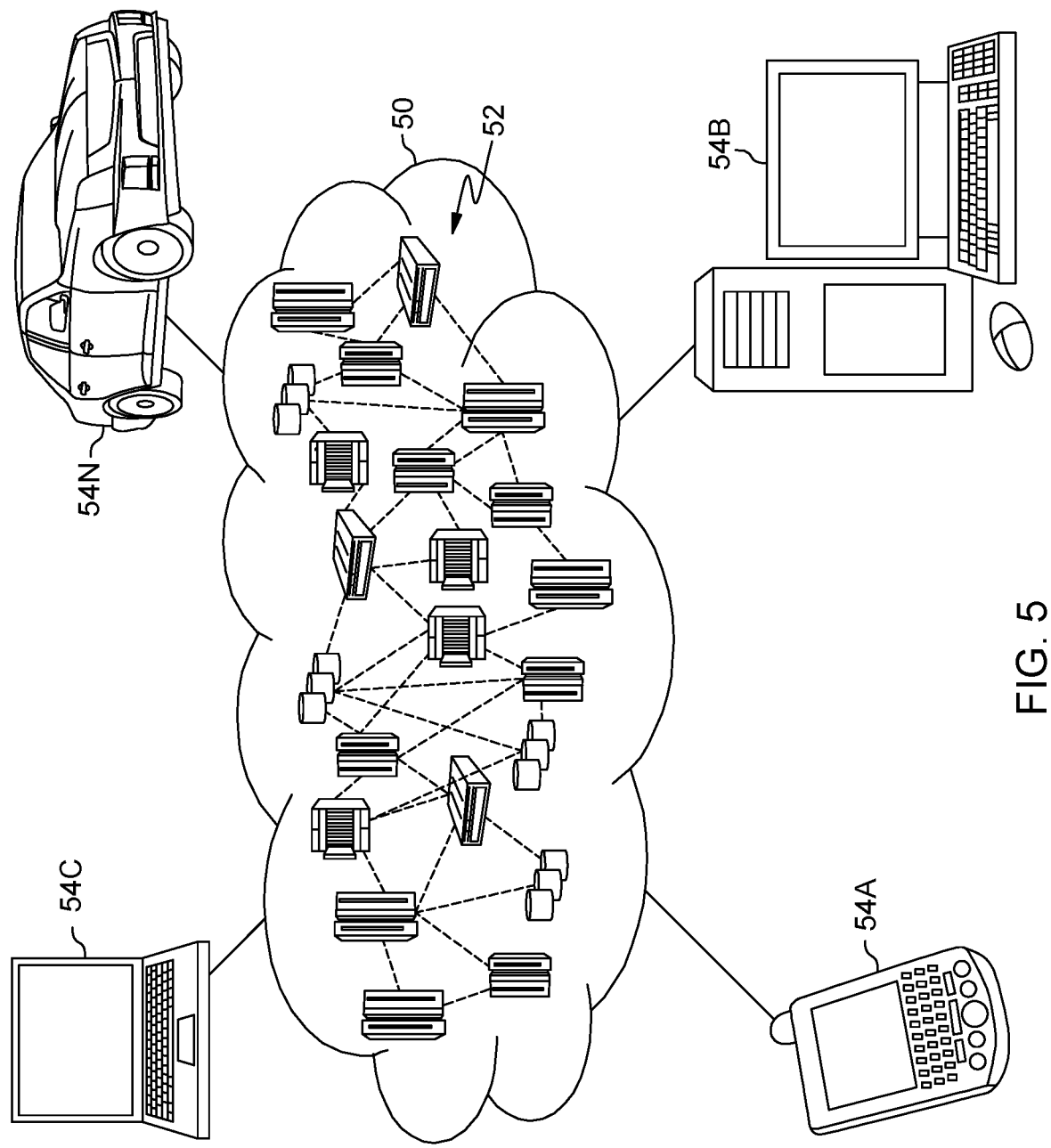
FIG. 5 depicts one embodiment of a cloud computing environment, in accordance with one or more aspects of the present invention.

Referring now to FIG. 5, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 52 and cloud computing environment 50 can communicate with any type of computerized device over any type of network and/or network addressable connection (e.g., using a web browser).

Figure 6:
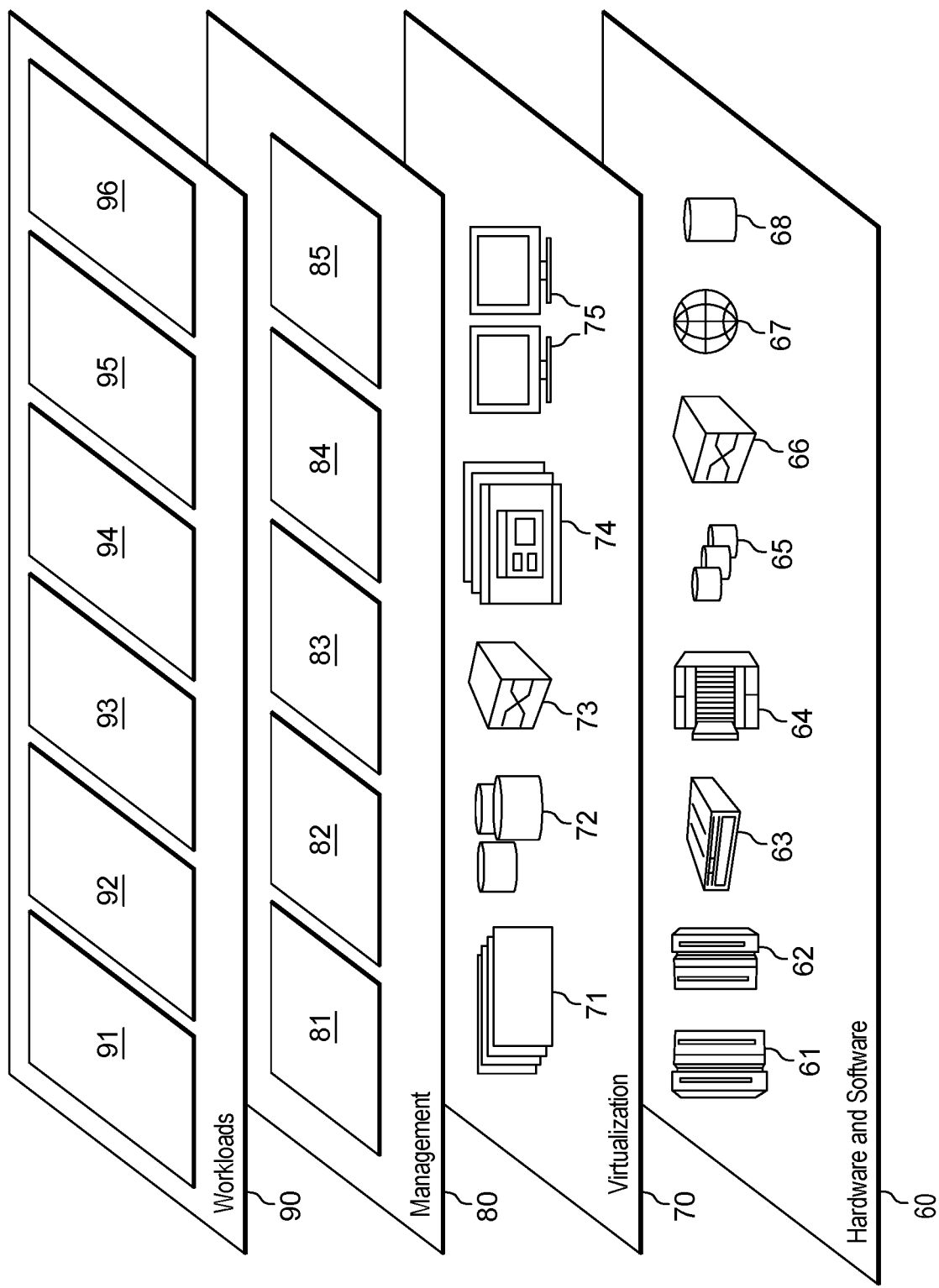
FIG. 6 depicts one example of abstraction model layers, in accordance with one or more aspects of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and loop transformation processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different types of statistical analyzers, transformation and/or techniques may be employed. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
　　one or more computer readable storage media and program instructions collectively stored on the one or more computer readable storage media to perform a method comprising:
　　　　translating, using a compiler executing on a processor of the computing environment, source code of a computer program to machine code, the machine code including a loop that has an early exit indication, wherein the loop is terminated prior to a last iteration of the loop;

determining, by the compiler, using statistical information relating to the loop that has the early exit indication that the loop is to be transformed to minimize iterations of the loop to reach the early exit indication;

transforming the loop, by the compiler, based on determining that the loop is to be transformed, wherein the transforming the loop generates a transformed loop and wherein the transforming the loop changes how the transformed loop iterates such that the early exit indication in the transformed loop is reached in fewer iterations compared to the early exit indication in the loop prior to transformation; and executing the machine code to perform a task of the computer program.

2. The computer program product of claim 1, wherein the transforming the loop comprises performing loop reversal for the transformed loop.

3. The computer program product of claim 1, wherein the transforming the loop includes:

splitting the loop into a plurality of loops having separate iteration spaces, the plurality of loops having a particular order; and performing re-ordering of the plurality of loops, wherein at least one loop of the plurality of loops is in a different order from the particular order.

4. The computer program product of claim 3, wherein the method further comprises determining from the loop a plurality of groups of iteration exit points of the loop, and wherein the splitting the loop into the plurality of loops is performed based on the plurality of groups.

5. The computer program product of claim 4, wherein the determining the plurality of groups of iteration exit points of the loop comprises:

grouping the iteration exit points of the loop to obtain multiple candidate splitting groups;

sorting the multiple candidate splitting groups by a predefined order;

performing filtering on the multiple candidate splitting groups in which one or more candidate splitting groups is potentially eliminated from the multiple candidate splitting groups to obtain a set of candidate splitting groups; and expanding the set of candidate splitting groups to provide the plurality of groups of iteration exit points of the loop used to provide the plurality of loops.

6. The computer program product of claim 5, wherein the method further comprises:

determining that a given loop of the plurality of loops meets a defined criteria for loop reversal; and performing loop reversal for the given loop based on determining that the given loop meets the defined criteria for loop reversal.

7. The computer program product of claim 6, wherein the defined criteria for loop reversal includes having a higher probability of exiting the given loop toward an end of the given loop than a beginning of the given loop.

8. The computer program product of claim 3, wherein the transforming the loop further includes performing loop reversal for at least one loop of the plurality of loops.

9. The computer program product of claim 1, wherein the method further comprises checking that the loop qualifies for transformation, and wherein the determining that the loop is to be transformed is performed based on the checking indicating that the loop qualifies for transformation.

10. The computer program product of claim 9, wherein the checking that the loop qualifies for transformation includes determining whether data dependencies of the loop will be preserved should transformation be performed.

11. A computer system for facilitating processing within a computing environment, the computer system comprising:

a memory; and at least one processor in communication with the memory, wherein the computer system is configured to perform a method, said method comprising:

translating, using a compiler executing on a processor of the computing environment, source code of a computer program to machine code, the machine code including a loop that has an early exit indication, wherein the loop is terminated prior to a last iteration of the loop;

determining, by the compiler, using statistical information relating to the loop that has the early exit indication that the loop is to be transformed to minimize iterations of the loop to reach the early exit indication;

transforming the loop, by the compiler, based on determining that the loop is to be transformed, wherein the transforming the loop generates a transformed loop and wherein the transforming the loop changes how the transformed loop iterates such that the early exit indication in the transformed loop is reached in fewer iterations compared to the early exit indication in the loop prior to transformation; and executing the machine code to perform a task of the computer program.

12. The computer system of claim 11, wherein the transforming the loop comprises performing loop reversal for the transformed loop.

13. The computer system of claim 11, wherein the transforming the loop includes:

splitting the loop into a plurality of loops having separate iteration spaces, the plurality of loops having a particular order; and performing re-ordering of the plurality of loops, wherein at least one loop of the plurality of loops is in a different order from the particular order.

14. The computer system of claim 13, wherein the method further comprises determining from the loop a plurality of groups of iteration exit points of the loop, wherein the splitting the loop into the plurality of loops is performed based on the plurality of groups, and wherein the determining the plurality of groups of iteration exit points of the loop comprises:

grouping the iteration exit points of the loop to obtain multiple candidate splitting groups;

sorting the multiple candidate splitting groups by a predefined order;

performing filtering on the multiple candidate splitting groups in which one or more candidate splitting groups is potentially eliminated from the multiple candidate splitting groups to obtain a set of candidate splitting groups; and expanding the set of candidate splitting groups to provide the plurality of groups of iteration exit points of the loop used to provide the plurality of loops.

15. A computer-implemented method of facilitating processing within a computing environment, the computer-implemented method comprising:

translating, using a compiler executing on a processor of the computing environment, source code of a computer program to machine code, the machine code including a loop that has an early exit indication, wherein the loop is terminated prior to a last iteration of the loop;

determining, by the compiler, using statistical information relating to the loop that has the early exit indication that the loop is to be transformed to minimize iterations of the loop to reach the early exit indication;

transforming the loop, by the compiler, based on determining that the loop is to be transformed, wherein the transforming the loop generates a transformed loop and wherein the transforming the loop changes how the transformed loop iterates such that the early exit indication in the transformed loop is reached in fewer iterations compared to the early exit indication in the loop prior to being transformed; and executing the machine code to perform a task of the computer program.

16. The computer-implemented method of claim 15, wherein the transforming the loop comprises performing loop reversal for the transformed loop.

17. The computer-implemented method of claim 15, wherein the transforming the loop includes:

splitting the loop into a plurality of loops having separate iteration spaces, the plurality of loops having a particular order; and performing re-ordering of the plurality of loops, wherein at least one loop of the plurality of loops is in a different order from the particular order.

18. The computer-implemented method of claim 17, further comprising determining from the loop a plurality of groups of iteration exit points of the loop, wherein the splitting the loop into the plurality of loops is performed based on the plurality of groups, and wherein the determining the plurality of groups of iteration exit points of the loop comprises:

grouping the iteration exit points of the loop to obtain multiple candidate splitting groups;

sorting the multiple candidate splitting groups by a predefined order;

performing filtering on the multiple candidate splitting groups in which one or more candidate splitting groups is potentially eliminated from the multiple candidate splitting groups to obtain a set of candidate splitting groups; and expanding the set of candidate splitting groups to provide the plurality of groups of iteration exit points of the loop used to provide the plurality of loops.

19. The computer-implemented method of claim 17, wherein the transforming the loop further includes performing loop reversal for at least one loop of the plurality of loops.

20. The computer program product of claim 1, wherein the transforming the loop changes how the transformed loop iterates includes changing an order of indices of the transformed loop.

* * * * *